US011310049B2

(12) United States Patent
De Hoogh et al.

(10) Patent No.: US 11,310,049 B2
(45) Date of Patent: Apr. 19, 2022

(54) HOMOMORPHIC ENCRYPTION FOR PASSWORD AUTHENTICATION

(71) Applicant: KONINKLIJKE PHILIPS N.V., Eindhoven (NL)

(72) Inventors: Sebastiaan Jacobus Antonius De Hoogh, Oosterhout (NL); Alan Pestrin, Salzburg (AT)

(73) Assignee: Koninklijke Philips N.V., Eindhoven (NL)

( * ) Notice: Subject to any disclaimer, the term of this patent is extended or adjusted under 35 U.S.C. 154(b) by 133 days.

(21) Appl. No.: 16/954,270

(22) PCT Filed: Dec. 6, 2018

(86) PCT No.: PCT/EP2018/083710
§ 371 (c)(1),
(2) Date: Jun. 16, 2020

(87) PCT Pub. No.: WO2019/121026
PCT Pub. Date: Jun. 27, 2019

(65) Prior Publication Data
US 2021/0091955 A1   Mar. 25, 2021

(30) Foreign Application Priority Data

Dec. 19, 2017 (EP) .................... 17208570

(51) Int. Cl.
*G06F 11/30* (2006.01)
*H04L 9/32* (2006.01)
*H04L 9/00* (2022.01)
*G06F 12/14* (2006.01)

(52) U.S. Cl.
CPC ............ *H04L 9/3226* (2013.01); *H04L 9/008* (2013.01)

(58) Field of Classification Search
CPC .............................. H04L 9/008; H04L 9/3226
See application file for complete search history.

(56) References Cited

U.S. PATENT DOCUMENTS

| | | | | |
|---|---|---|---|---|
| 7,735,121 B2 * | 6/2010 | Madani | .................... | G06F 21/83 |
| | | | | 726/6 |
| 8,352,380 B2 * | 1/2013 | Canard | ................. | H04L 9/3255 |
| | | | | 705/75 |
| 8,959,603 B2 * | 2/2015 | Ogawa | .................... | G06F 21/36 |
| | | | | 726/6 |
| 9,002,750 B1 * | 4/2015 | Chu | ...................... | H04W 12/04 |
| | | | | 705/72 |

(Continued)

OTHER PUBLICATIONS

Kieffer et al "Zero-Knowledge Password Policy Checks and Verifier-Based PAKE" International Assoc. for Cryptologic Research, vol. 20150113 Jan. 13, 2015 p. 1-16.

(Continued)

*Primary Examiner* — Gary S Gracia

(57) ABSTRACT

Some embodiments are directed to a server device (100) and a client device (200) arranged to authenticating a user of client device (200). The user has access to an authentication string. Server device (100) is configured to encrypt a set of character/position data according to a homomorphic encryption algorithm. The client device allows the user to select a subset from the encrypted set from which a verification number is computed using the homomorphic operation.

28 Claims, 5 Drawing Sheets

(56) References Cited

U.S. PATENT DOCUMENTS

| | | | |
|---|---|---|---|
| 9,565,020 B1* | 2/2017 | Camenisch | H04L 63/0815 |
| 2012/0185934 A1* | 7/2012 | Lee | G06F 21/629 |
| | | | 726/18 |
| 2013/0129093 A1* | 5/2013 | Patel | H04W 12/04 |
| | | | 380/270 |
| 2014/0310524 A1* | 10/2014 | Yamanaka | H04L 9/3242 |
| | | | 713/170 |
| 2015/0169855 A1* | 6/2015 | Milya | G06F 21/31 |
| | | | 726/19 |
| 2015/0227930 A1* | 8/2015 | Quigley | H04L 9/3226 |
| | | | 705/72 |
| 2015/0254453 A1* | 9/2015 | Sugiyama | G06F 21/46 |
| | | | 713/183 |
| 2016/0119346 A1* | 4/2016 | Chen | H04L 63/123 |
| | | | 713/170 |
| 2016/0292413 A1* | 10/2016 | Williams | G06F 21/31 |
| 2017/0237725 A1* | 8/2017 | Camenisch | H04L 9/008 |
| | | | 713/171 |
| 2018/0227278 A1* | 8/2018 | Camenisch | H04L 9/006 |

OTHER PUBLICATIONS

Pedersen.: "Non-interactive and Information-Theoretic Ssecure Veriable Secret Sharing". In Advances in Cryptology CRYPTO '91 Springer (1991).

T. ElGamal.: "A public key cryptosystem and a signature scheme based on discrete logarithms" In Proceedings of CRYPTO 84 on Advances in Cryptology, pp. 10-18, New York,(1985).

Y. Tsiounis and M. Yung.: On the security of ElGamal based encryption. In H. Imai and Y. Zheng, editors, Public Key Cryptography, vol. 1431 of Lecture Notes in Computer Science, pp. 117-134. Springer, 1998.

Search Report from PCT/EP2018/083710 dated Feb. 4, 2019.

\* cited by examiner

HOMOMORPHIC ENCRYPTION FOR PASSWORD AUTHENTICATION

CROSS-REFERENCE TO PRIOR APPLICATIONS

This application is the U.S. National Phase application under 35 U.S.C. § 371 of International Application No. PCT/EP2018/083710, filed on Dec. 6, 2018, which claims the benefit of EP Patent Application No. EP 17208570.6, filed on Dec. 19, 2017. These applications are hereby incorporated by reference herein.

FIELD OF THE INVENTION

The invention relates to a client device, a server device, a server method, a client method, and a computer readable medium.

BACKGROUND OF THE INVENTION

U.S. Pat. No. 7,735,121 discloses a known system for securely communicating information over a communication network. The known method may be used to enter authenticating information such as a PIN code.

The known system comprises a remote computing device coupled to a web server through a remote communication network. A web page, used to authenticate a user, comprises a virtual pad from which the user may enter private information. The virtual pad comprises a plurality of alpha-numeric keys which may be directly selected from the display of the user's remote computing device to enter private information. The alpha-numeric characters are randomly displayed in different locations in the virtual pad. The actual characters displayed in the virtual pad are correlated with an alternative character set stored in a database on an authentication server. The characters from the alternative character set that corresponds to the private information entered by the user are then be encrypted using secure socket layer (SSL) and communicated to the authentication server.

There are several problems associated with the known system. For example, the web server is vulnerable to a memory scraping attack. After decrypting the response from the user, the user's password is visible in memory. An attacker with access to the server's memory can obtain the password from it. Likewise at the client side, an attacker can record the data that is sent from the user device and later replay it to impersonate the user to the server.

SUMMARY OF THE INVENTION

A client device and server device are provided as defined in the claims which are arranged for authentication. The server device uses homomorphic encryption to encrypt a set of character/position data according to a homomorphic encryption algorithm. The client device computes a verification number from the encrypted character/position data. Because the character/position is encrypted using homomorphic encryption the computation of the verification number can be performed on the encrypted data, without decryption being necessary. Finally, only the verification number needs to be returned. The server can thus verify if the received and a stored verification number agree with each other without having to know which character/position data was selected, that is the server does not need to know the authentication string, e.g., the password or PIN code of the user.

In an embodiment, the server device obtains display data for the characters in the character set, and associates the display data with an encrypted character/position data corresponding to the character. The user can select at the client device the display data corresponding to the characters in the authentication string. Thus, even at the client device the authentication string is not needed in its memory. The display data preferably is hard to read for a machine, e.g., non-machine readable. Even if the display data is hard to read, even if perhaps not impossible, it will complicate automated attacks.

The method of authentication described herein may be applied in a wide range of practical applications. Such practical applications include communication systems, e.g., to protect the authenticity of messages, financial systems, e.g., to protect financial transactions, storage systems, e.g., to protect the authenticity of data, etc.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1 schematically shows an example of an embodiment of an authentication system, FIG. 2 schematically shows an example of an embodiment of data dependencies, FIG. 3 schematically shows an example of an embodiment of a character/position data, FIG. 4 schematically shows an example of an embodiment of a display data, FIG. 5 schematically shows an example of an embodiment of a server method and a client method, FIG. 6a schematically shows a computer readable medium having a writable part comprising a computer program according to an embodiment, FIG. 6b schematically shows a representation of a processor system according to an embodiment.

Figure 1:
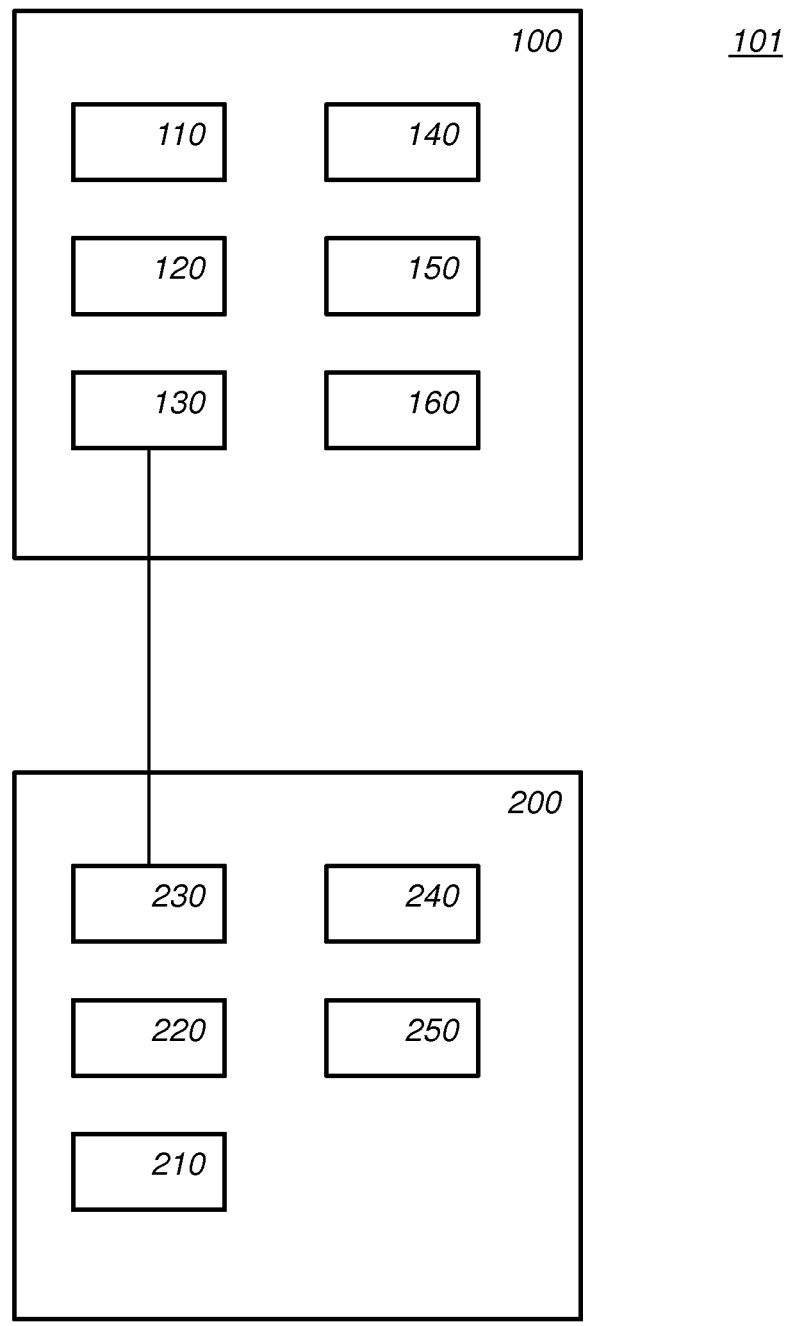

LIST OF REFERENCE NUMERALS, IN FIGS.
1-4

100 a server device
101 an authentication system
110 a verification number storage
120 an encryption unit
130 a communication interface
140 a comparison unit
150 a permutation generator
160 a display data unit
200 a client device
210 a display
220 a user interface
230 a communication interface
240 a homomorphic computation unit
250 a storage
310 a set of character/position data,
320 a subset of set of character/position data
325, 326 an authenticating string
330 a first unblinded verification number
340 a first verification number
345, 346 a blinding number
350 an encrypted set of character/position data
360 a subset of the encrypted set of character/position data
370 a second unblinded verification number
380 a second set of character/position data
410 multiple positions,
420 a character set
430 a character/position number
500 a permutation
510 display data
511 a display data
530 encrypted character/position data
520-529 encrypted character/position data

DETAILED DESCRIPTION OF THE EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them. Further, the invention is not limited to the embodiments, and the invention lies in each and every novel feature or combination of features described herein or recited in mutually different dependent claims.

A popular authentication mechanism is a combination of username and password, also known as user credentials. Typically, the credentials are sent to an authenticating server to verify. When an attacker obtains the credentials of some user, then he is able to impersonate the user on the server, that is, the attacker can convince the server that he is the user from which he stole the credentials. Unfortunately, in practice, many users are using the same passwords in multiple applications. Because of this, the attacker is able to impersonate the user in more applications than just the one he broke.

It is a problem that some attackers are able to read the memory when the user is entering his/her credentials. These attacks are known as memory scraping. Existing solutions are mainly based on multiple factor authentication, where a user has to perform multiple authentication steps on, preferably, separate devices. As a result, just scraping the credentials is not enough for the attacker to impersonate the user on the server, but on the other hand, the user loses sensitive data (his password, which he is likely to use in multiple applications).

A possible solution may be to ensure that the password is never present in memory. For example, one may have the user enter a sequence of numbers using a secure keyboard in such a way that the location of the pressed button does not leak the value of the number, and the value resulting from pressing a button is not the value in plain, but an encoding of the value.

This secure keyboard ensures that all information of the password, e.g., a PIN, is hidden from a memory scraper. Such a solution will not leak the sensitive personal password to such an attacker. However, an attacker could just scrape and replay the encoded password to the server to still impersonate the user.

To authenticate to a server, a client typically sends his credentials over a secure channel. The server then uses his database to verify whether the username and password combination matches. For example, the database contains combinations of usernames $\mathcal{U}$ and (salted) hashes of the corresponding password $\mathcal{H}_U$. When a server gets a username U and a password p he computes H(p) and verifies whether $H(p)=\mathcal{H}_U$.

If the attacker is able to attack the server, then he can find the database containing (derivatives of) user credentials. There are good solutions to prevent the attacker from getting to the sensitive passwords from the database, like the use of cryptographic hashes in the previous example. However, when an attacker is able to scrape the memory of an active server, then in most scenario's he will see the password plain in memory of the server. Below embodiments are described that use homomorphic encryption to protect an authentication string, e.g., a password, during authentication, both at a client device and at a server device.

FIG. 1 schematically shows an example of an embodiment of an authentication system 101. Authentication system 101 comprises a client device 200 and a server device 100, that have been configured so that client device 200 can authenticate a user of client device 200 to server device 100. The user is authenticated by proving that he has knowledge of an authentication string.

Client device 200 and server device 100 may be electronic devices configured as embodiments of the inventions. Client device 200 comprises a communication interface 130 arranged to communicate with the server device, and server device 100 comprises a communication interface 130. These communication interfaces are arranged to communicate with each other in digital format, e.g., by exchanging digital messages, e.g., over a computer network. For example, the computer network may be an internet, intranet, WLAN, etc. The computer network may be the internet. For example, communication interfaces 130 and/or 230 may be a wired interface, e.g., an Ethernet port. For example, communication interfaces 130 and/or 230 may be a wireless interface, e.g., a Wi-Fi interface, e.g., comprising a Wi-Fi antenna.

Client device 200 and server device 100 cooperate so that the client device can authenticate a user of client device 200 to server device 100. For example, server device 100 may be configured for some service for which the user is authorized but other users are not. For example, server 100 may be a file server, which stores documents to which the user has access, a streaming server, which provides access to valuable content, a web shop, in which a user's credit card information is stored, etc.

Client device 200 and server device 100 each comprise a processor circuit. They may also comprise a memory comprising computer process instructions. The processor circuit is arranged to execute the instructions stored in the memory. The execution of the authentication is implemented in the processor circuit, examples of which are shown herein. FIG. 1 shows functional units that may be functional units of the processor circuit. For example, FIG. 1 may be used as a blueprint of a possible functional organization of the processor circuit. The processor circuit is not shown separate from the units in FIG. 1. For example, the functional units shown in FIG. 1 may be wholly or partially implemented in computer instructions that are stored at device 100 or 200, e.g., in an electronic memory of device 100 or 200, and are executable by a microprocessor of device 100 or 200. In hybrid embodiments, functional units are implemented partially in hardware, e.g., as coprocessors, e.g., crypto coprocessors, and partially in software stored and executed on device 100 or 200.

Server device 100 is configured to authenticate a user from client device 200. The user has access to an authentication string. The authentication string has multiple characters at multiple positions, wherein the characters are selected from a character set. For example, the authentication string may be a PIN, in which case the character set are the numbers $\{0, 1, 2, \ldots, 9\}$. For example, the authentication string may be an alphanumerical string, in which case the character set may be $\{a, \ldots, z, A, \ldots, Z, 0, \ldots, 9\}$. Furthermore, one or punctuation characters may be added to the character set, as is desired in authentication system 101.

Server device 100 comprises a storage 110 configured to store a first verification number, e.g., a verification number storage 110. During a set-up phase, the first verification number has been computed from the authentication string. However, in an embodiment, knowledge of the first verification number does not suffice to obtain the authentication string. Moreover, the first verification number cannot be used by itself to authenticate to server 100. In other words, even if an attacker were to obtain the first verification number, then this would not help him, neither to obtain the authentication string, nor to authenticate to server device 100. Client device 200 is configured so that during the authentication process, a second verification number is computed from the authentication string. The client device 200 can do this because the user supplies inputs based on his knowledge of the authentication string. The second verification number is then sent to the server device 100. The correspondence between the first and second verification number is verified, which in turn verifies that both verification numbers were computed from the same authentication string. Accordingly, the user is authenticated.

Verification number storage 110 may comprise multiple verification numbers for multiple users. For example, a verification number may be associated with a username. For example, pairs of a verification number and a username may be stored. The association may be through a derivative of the username, e.g., a hash or salted hash. In that case, the verification number storage 110 may store a verification number together with the derivative.

Figure 2:
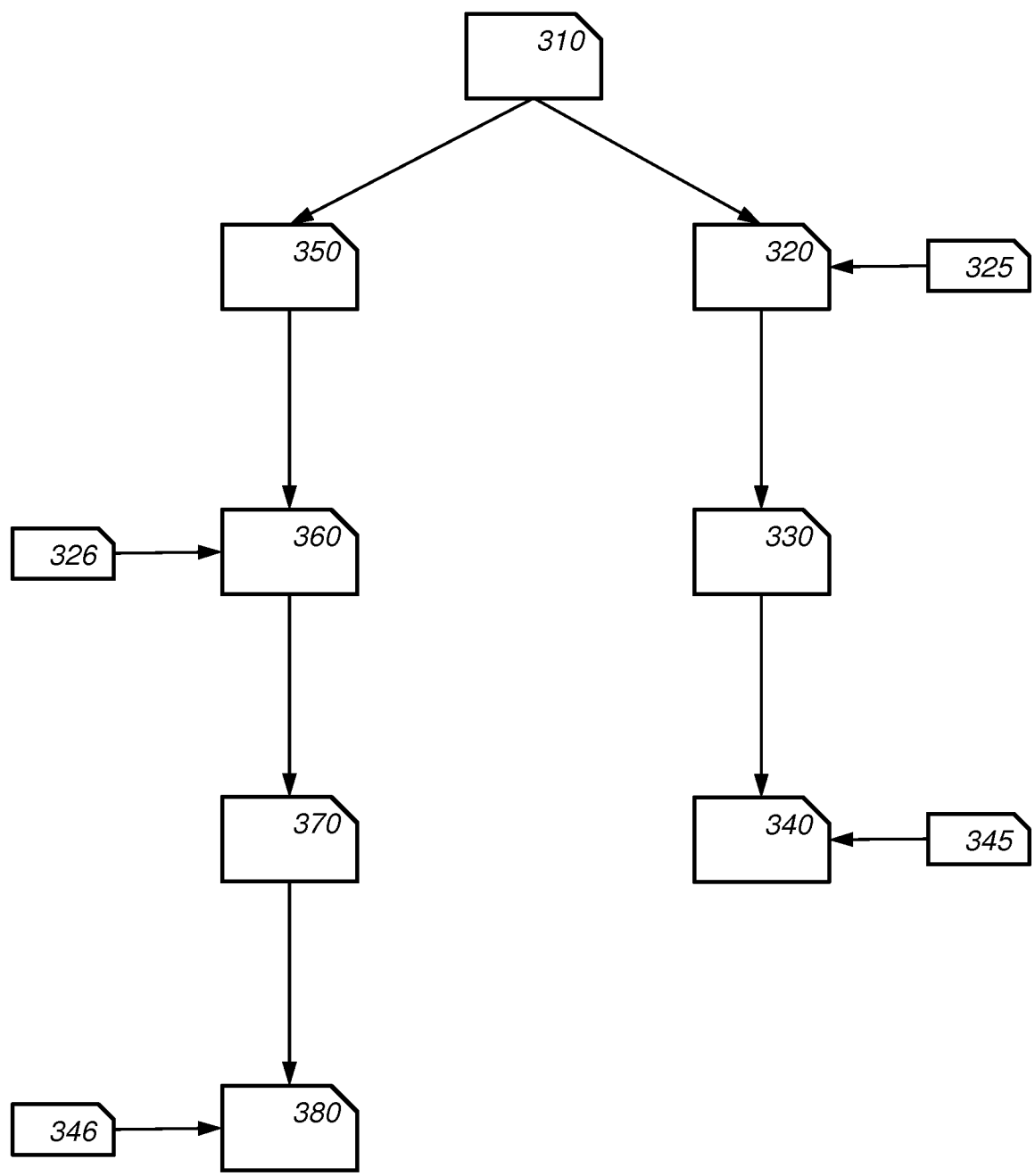

FIG. 2 schematically shows an example of an embodiment of possible data dependencies. The figure explains a possible relationship between the first and second verification number and the authentication string.

FIG. 2 show a set 310 of character/position data. Set 310 comprises a number for each combination of a character from the character set and a position in an authentication string. The character/position data may be secret but this is not necessary; this may be public data. Typically, the numbers are selected from a finite group, ring or field, e.g., as is used by the homomorphic encryption scheme that is used. A homomorphic encryption scheme allows data, e.g., numbers, say in a group, to be encrypted. Moreover, there is at least one binary operation which can be performed on the encrypted numbers. For example, a homomorphic encryption scheme that supports addition allows the sum of a set of number to be computed while encrypted. For, example, for such an encryption E, there is an f, such that, $f(E(x_1), \ldots, E(x_n))=E(x_1+\ldots+x_n)$. That is, the encryption of the sum can be computed from the encrypted summands, moreover this can be done without knowledge of the decryption key. Some homomorphic encryption schemes may support multiplication. There are also homomorphic encryption schemes that support more than one operation, e.g., addition and multiplication. Although such schemes may be used in an embodiment, such complicated types of homomorphic encryption are not required, since only one operation is needed. Examples of homomorphic encryption schemes include: (unpadded) RSA, ElGamal, Goldwasser-Micali, Benaloh, Paillier, etc. For example, the numbers may be selected from the group of integers modulo a prime number. Other examples, are groups on elliptic curves, generated by some generator. The group of invertible numbers modulo a composite number, etc.

Figure 3:
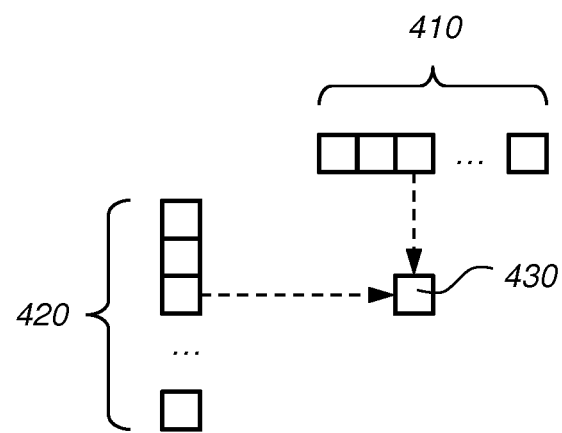

FIG. 3 schematically shows an example of an embodiment of character/position data. Shown are multiple positions 410. An authentication string may be obtained by selecting a character from a character set 420 for each position of the authentication string. For each combination of a position in the multiple positions 410 and for each character in the character set 420 a character/position number is selected. If there are n positions and m possible characters, then typically there are nm character/position numbers. Some combinations may be omitted, but at the consequence that those character/positions combinations are not possible in an authentication string.

In an embodiment, an authentication string may be of a pre-determined length, or the authentication string may have any length, at least 2, less than some maximum length. However, there is no requirement that an authentication string uses all positions in the multiple positions. For example, authentication strings of different lengths may be supported by leaving some positions open. Alternatively, one could reduce the amount of character/position data by encoding one character as an empty position. Authentication strings of different lengths may also be supported by including a padding character in the character set. Authentication strings may be required to have padding characters at most as a consecutive string at the end of the authentication string. FIG. 3 shows one combination of a position and a character: number 430.

In an embodiment, the character/position data are random numbers. Using random numbers implies a small risk that there may be two different authentication strings that give the same verification numbers. Accordingly, there may be multiple authentication strings that would be accepted when authenticating that user. However, the risk of this happening is small, and the alternative authentication strings are unknown. Moreover, the risk can be made as small as desired by selecting a larger group, etc., for the homomorphic encryption.

In an embodiment, set 310 of character/position data is chosen such that any subset produces a different result for the operation supported by the homomorphic encryption. For example, if the homomorphic encryption supports addition, then set 310 of character/position data may be chosen to be multiples of powers of a base number. The base number may be chosen as the number of characters in the character set. For example, if the supported operation is addition then this choice will give a different summation for each subset.

For example, if the homomorphic encryption supports multiplication, then set 310 of character/position data may be chosen to be powers, wherein the exponents are multiples of powers of a base number. The base number may be chosen as the number of characters in the character set. For example, if the supported operation is multiplication then this choice will give a different multiplication for each subset. For example, the powers may be powers of a generator. An additional advantage of choosing the character/position data as powers of a generator is that the exponentiation serves as an additional encryption layer. In particular, it is harder to obtain the authentication string from a verification number, even if unblinded (see below).

In an embodiment, the character/position numbers are smaller than the size of the group. In an embodiment, the character/position numbers are powers of a base number, e.g., of a generator, and the exponents are smaller than the size of the group, or the order of the group generated by the generator. In an embodiment, the character/position numbers or the exponents are smaller than the order of the group divided by the size of the character set.

The character/position data may be public, but they need not be. In particular, for increased security against cryptographic attacks, the character/position data may be private for the client device. For example, if the character/position data is random data, an attacker analyzing the data exchanged between server and client device does not to which character/position data the observed data corresponds. The same set of character/position data is used during the set-up phase as well as during each of the subsequent authentication phases. The character/position data may be randomly selected for each user for server device 100 supports authentication.

The authentication string 325 determines a subset 320 of set 310 of character/position data. In particular, the character/position numbers corresponding to the characters actually used at the different positions of the authentication string are included in subset 320. From subset 320 a first verification number 340 is derived.

For example, the first verification number may be obtained from subset 320 by performing the operation supported by the homomorphic encryption, say, multiplied. For added security, this result may be blinded. For example, a first unblinded verification number 330 may be obtained from subset 320 by performing the supported operation, e.g., by multiplying the numbers in the subset. Next the first unblinded verification number 330 may be blinded with a blinding number 340. The latter is the (blinded) first verification number 340. For example, the supported operation may be used to include the blinding number; e.g. the blinding number may be added or multiplied to first unblinded verification number 330. The blinding number is optional. Without a binding number, an attacker who obtains the first unblinded verification number 330 could run a dictionary attack to determine the authentication string. The blinding number reduces the information that the unblinded verification number 330 contains on the authentication string 325, e.g., possibly reduces it to zero. Below we will assume that the first authentication number is blinded, but this is not necessary. The blinding number may be a random number, e.g., generated by a random number generator.

Note that neither authentication string 325, unblinded verification number 330, nor blinding number 345 is needed by the server device during an authentication phase. For example, a server device could compute the first verification number 340 during a set-up phase, and then delete the unneeded information. For example, the server device could receive the first verification number 340 during a set-up phase, e.g., from a client device or from a trusted third party. During an authentication phase, the server device needs the character/position data 310 and the first verification number, whether blinded or not. If the character/position data 310 is not random, it may be computed when needed, rather than stored.

Server device 100 comprises an encryption unit 120. Encryption unit 120 is configured to encrypt set 310 of character/position data according to the homomorphic encryption algorithm. The encryption is on a per element basis. In FIG. 3, this is shown as encrypted set 350. During an authentication, an encrypted set 350 is sent to client device 200. To avoid replay, it is preferred if the result of this encryption is different for different authentications. For example, this may be assured by using a different key each time the set 310 is encrypted, e.g., by selecting a random key. For example, this may be assured by selecting a probabilistic encryption scheme (or both). For example, the encryption scheme may be ElGamal encryption, which is a homomorphic and probabilistic encryption scheme.

Client device 200 comprises a homomorphic computation unit 240. Homomorphic computation unit 240 is configured to compute an encrypted second verification number from a subset 360 of the encrypted set 350 of character/position data. The encrypted set 350 is received from server device 100. For example, the user of client device 200 may select the subset 360 of the received set 350 on the basis of his/her knowledge of authentication string 326. If authentications string 325 and authentication string 326 are the same, then subset 360 is the same as subset 320 with the difference that subset 360 is encrypted but subset 320 is not. For example, the received set 350 may comprise an indication which encrypted character/position number corresponds to which character/position. For example, the set 350 may be sorted. For example, the user may enter the authentication string at a user interface 220 of client device 200, e.g., at a keyboard of touch screen, etc., to select subset 360.

The indication may be machine-readable or not machine-readable. A disadvantage of indicating which encrypted character/position number in set 350 corresponds to which character/position in a machine-readable way, is that client device 200 may become scrapable, even though server device 100 is not. Avoiding attacks at server 100 is worthwhile, since an attack at server 100 typically implies that many authentication strings are compromised. Since authentication string are often re-used, this can have large security ramifications. Below a solution is presented which reduces the risk of an attack at the client device 200 is reduced as well though.

Homomorphic computation unit 240 is configured to homomorphically compute an encrypted second verification number from a subset of the encrypted set of character/position data. For example, homomorphic computation unit 240 may perform the same computation as is done on set 320 to obtain number 330, with the difference that homomorphic computation unit 240 performs the computation on encrypted data. Second verification number 370 is encrypted but unblinded.

If blinding is used then homomorphic computation unit 240 may be configured to blind the encrypted second verification number with blinding number 346. If homomorphic computation unit 240 performs the same computation and blinding (albeit on encrypted data) and uses the same binding number (but encrypted), then second verification number 380 is the same as first verification number 340, albeit encrypted.

There are several ways in which client device 200 may obtain the encrypted blinding number. For example, the encrypted blinding number may be obtained during the set-up phase, encrypted for each key that will be used during the authentication phase. The encrypted blinding numbers may be in a storage of device 200. In this case, the same key or a limited number of keys may be used during authentication. Alternatively, the encryption scheme may be a public/private key encryption scheme. Client device 200 may receive the public key which is also used to encrypt set 310 to obtain set 350. In that case, homomorphic encryption unit 240 may encrypt the blinding number itself. The blinding number may be obtained from the user, or from a storage 250 of client device 200.

The second verification number, whether unblinded number 370 or blinded number 380, is sent to server device 100. Server device 100 comprises a comparison unit 140. Comparison unit 140 is configured to verify the correspondence between the first verification number and the encrypted second verification number to authenticate the user. For example, if client device 200 performs the same computation as server device 100 (but on encrypted data), then comparison unit 140 may be configured to decrypt the second verification number to compare it with the first verification number for equality. This is not necessary though, for example, homomorphically encryption unit 240 may be configured to compute a different number, for example, homomorphically encryption unit 240 may be configured to compute twice the first verification number, or to add a constant to it. More generally, if v is the unblinded verification number, then homomorphically encryption unit may compute av, v+b, or av+b, etc. for constant a and b. These may be blinded by the blinding number, either before or after the additional computation. For example, homomorphically encryption unit 240 may compute avy, and comparison unit 140 may verify that the second verification number is a times larger than the first verification number.

As pointed out above, the above embodiment protects against scraping at the server but may be scraped at the client device. In an embodiment, additional optional protection is offered as follows. In an embodiment, server device 100 comprises a permutation generator 150 and a display data unit 160. Permutation generator 150 is configured to generate a permutation of the character set. Permutation generator 150 may generate a permutation for each position, but may also generate fewer permutation than positions, in which some permutations are re-used. For example, the same permutation may be used for each position. Preferably, at least a new permutation is generated for each authentication. Server device 100 may comprise a random number generator to generate the character/position data and/or the permutation.

Display data unit 160 is configured to obtain display data for the characters in the character set. The display data depict the characters of the character set but in a non-machine-readable way. In an embodiment, the display data is retrieved from a display data store, or retrieved from an external display data generator device. The display data may also be generated on service device 100. Generating the display data is known per se. For example, known algorithms to generate so-called captcha. For example, a different set of display data is obtained for each position. Fewer display data sets may be generated than the number of positions, in this case some of the display data are re-used. For example, the same display data may be used for all positions. It is not even needed to use different display data for each authentication. In this case, a client device caches display data to be used in a subsequent authentication. Display data consumes relatively a lot of data, which is reduced by caching. The display data may be an image, e.g., for each character there may be an image. The display data may be a movie clip. For example, the movie is such that a human will recognize the character from the image or from the video clip, but a computer may not. At least requiring an attacker to analyze images or clips makes the attack more error prone, less automatable, and more resource intensive. Thus scaling an attack to many users instead of a few selected users becomes harder for the attacker. For example, a display data may be a jpg, png, etc., or an mp4, avi, etc.

Figure 4:
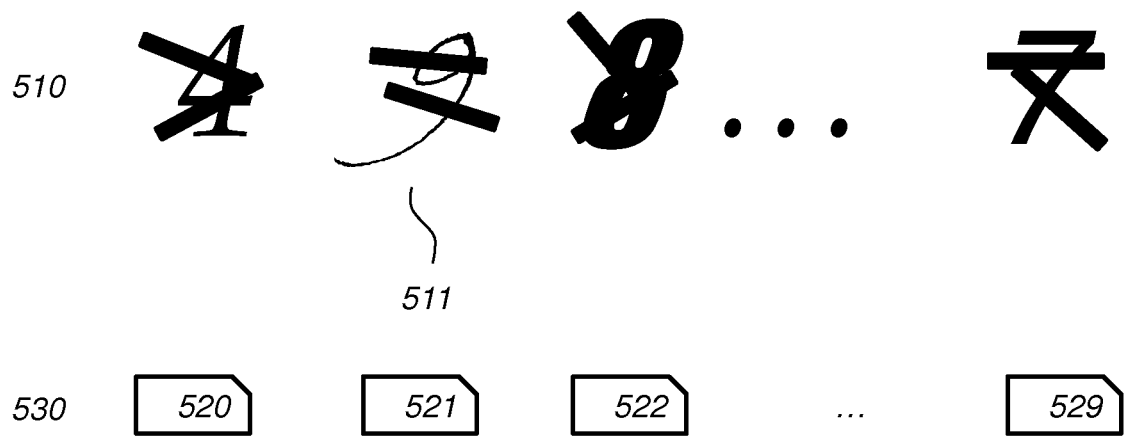

The display data is sent to client device 200 together with the set 350 of encrypted character/position data. The display data may be sent in the permuted order but associated with the correct character/position data. FIG. 4 shows a permutation 500 of a character set used for PIN codes. The same may be done for larger character sets. Permutation 500 may indicate the order in which the display data for the characters in the character set is sent to client device 200. Display data 510 is also shown in FIG. 4. Shown in display data 510 are the characters in the character set but in a non-machine-readable way, in the order as indicated in the permutation. In this case, the display data is generated by selecting a random font, and super-imposing two black bars in a random orientation. Any other way of generating non-machine-readable data as is known in the art may be used instead. Below the display data the corresponding encrypted character/position data 520-529 corresponding to the character, is shown. For example, if the display data 510 is generated for the first position, then character/position data 520-529 is the character/position data for the combination of a character in the character set and the first position. For the next position, new character/position data is used, and optionally also a new permutation and/or a new display set. In a more secure embodiment, each position has its own character/position data, display set and permutation.

Client device 200 is configured to receive display data from the server device associated with the encrypted character/position data. Client device 200 comprises a display 210. Display 210 is configured to display the received display data for each position. After display data for a particular position is displayed the user can select the correct character corresponding to that position in the authentication string. When a display data is selected the associated encrypted character/position is also selected for subset 360. For example, if the first character of the authentication string is a 9, then the user may select display data 511, and encrypted character/position data 521 is added to the subset 361. Thus the user selects the correct character/position data, even though an attacker does not know what it represents: the character/position data is both encrypted and corresponds to a display image that is not machine readable.

For example, client device 200 may be configured according to the following pseudo-code.

For each position in the authentication string do:
Display the display data which is received for the position
Receive a selection of a user for a displayed display data
Add the encrypted character/position data for the position and the selected character to subset 360.

Various embodiments of devices 100, and 200 may comprise an input interface, which may be selected from various alternatives. For example, the input interface may be a keyboard, a touch screen, a mouse, etc. Through the input interface display data may be selected.

Storages, such as storage 110, and 250 may be implemented as an electronic memory, say a flash memory, or magnetic memory, say hard disk or the like. Storage 110 or 250 may comprise multiple discrete memories together making up the storage. A storage may also be implemented as a local storage or as an external storage, say cloud storage. In the latter case, the device comprises a reading and writing unit to read write in the external storage, say over a network connection. For example, part of a storage may be secure storage and the rest may be normal storage. A storage may also comprise temporary memory, say a RAM.

Typically, the devices 100, and 200 each comprise a microprocessor (not separately shown) which executes appropriate software stored at devices 100, and 200; for example, that software may have been downloaded and/or stored in a corresponding memory, e.g., a volatile memory such as RAM or a non-volatile memory such as Flash (not separately shown). Alternatively, the devices 100, and 200 may, in whole or in part, be implemented in programmable logic, e.g., as field-programmable gate array (FPGA). Devices 100 and 200 may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

In an embodiment, devices 100 and 200 may comprise one or more circuits. The circuits implement the corresponding units described herein. The circuits may be a processor circuit and storage circuit, the processor circuit executing instructions represented electronically in the storage circuits.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Figure 5:
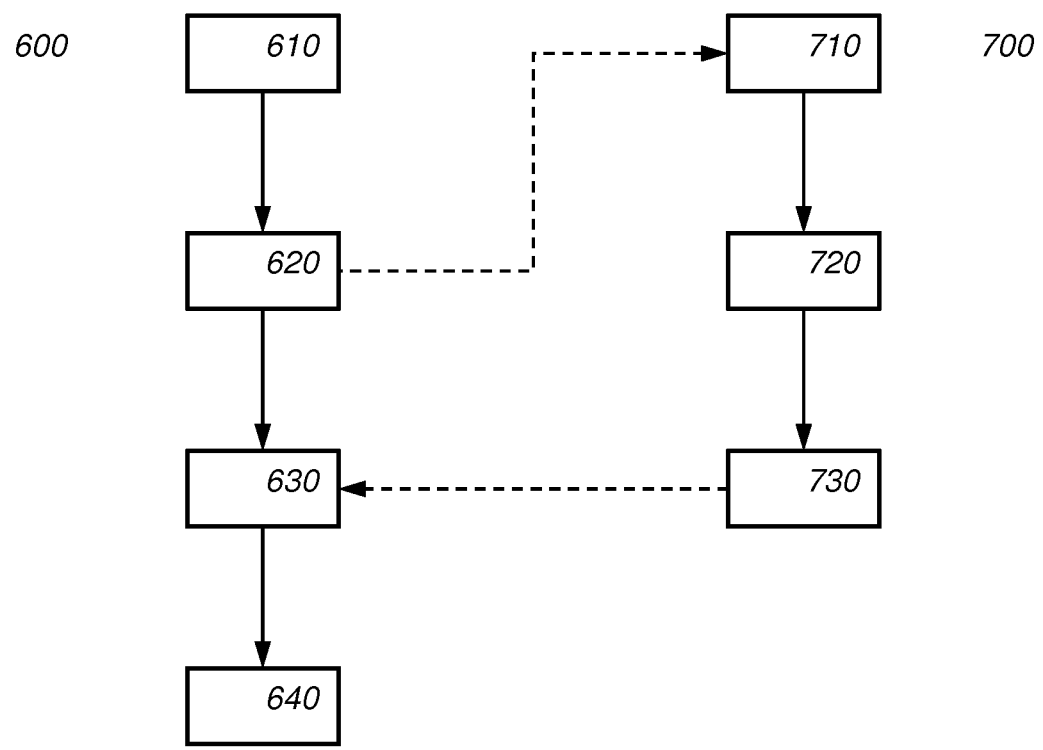

FIG. 5 schematically shows an example of an embodiment of a server method 500 and a client method 600.

Server method 600 is configured for authenticating a user from a client device, e.g., client device 200, the user having access to an authentication string. The authenticating string has multiple characters at multiple positions, the characters being selected from a character set. Server method 600 comprises storing (610) a first verification number computed from a subset of a set of character/position data, the subset being indicated by the authentication string, the set of character/position data comprising a number for the combinations of a character from the character set and a position in an authentication string, encrypting (620) the set of character/position data according to a homomorphic encryption algorithm, and sending the encrypted set to the client device, receiving (630) a second verification number from the client device, the second verification number being computed by homomorphically computing an encrypted second verification number from a subset of the encrypted set, said subset being indicated by the authentication string, and verifying (640) the correspondence between the first verification number and the encrypted second verification number to authenticate the user.

Client method 700 is configured for authenticating a user to a server device, e.g., server device 100. The user has access to an authentication string. The authenticating string has multiple characters at multiple positions, the characters being selected from a character set. The client method 700 comprises receiving 710 a set of character/position data encrypted according to a homomorphic encryption algorithm, the encrypted set of character/position data comprising a number for the combinations of a character from the character set and a position in an authentication string, homomorphically computing (720) an encrypted second verification number from a subset of the encrypted set of character/position data, the subset being indicated by the authentication string, sending (730) the encrypted second verification number to the server device.

Method 600 and 700 may comprise additional operations. In particular, they may include the obtaining, displaying and selecting of display data for the character set. Dependencies between the two methods are indicated with dashed arrows.

Many different ways of executing the methods are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started.

A method according to the invention may be executed using software, which comprises instructions for causing a processor system to perform methods 600 or 700. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

As described in above, authentication mechanism based on username and password are vulnerable to memory scraping attacks. These memory scraping attacks imply two threats. Firstly, impersonation of the user and secondly the loss of sensitive personal information. Known solutions do not address both threats. Furthermore, known servers are attractive targets, since they contain many sensitive passwords. Below further and/or more detailed embodiments are described, also using a more mathematical language.

Consider a secure keyboard. This provides protection against loss of the credentials due to memory scraping. A secure keyboard may be regarded as a sequence of tables $\{\mathcal{T}\}$ in which each row represents a digit between 0 and 9. There are 2 columns in such a table. One column has the data for the app to display the number, say $\omega_i$, and the second column has some arbitrary value. We denote by $\mathcal{T}_i$ the value in memory as a result of pressing the value on row of table $\mathcal{T}$, i.e., the value in the second column on row i of $\mathcal{T}$. The rows are permuted to hide the real values they represent. Each time the user enters a digit, a new table is loaded into memory to ensure that linking information, such as whether two entered digits are the same, is removed.

The following authentication scheme protects against replay attacks, but does not use homomorphic encryption. We assume that the server has a database where the user credentials are securely stored. This means that the database itself does not leak the (full) credentials of any user.

1. A user enters his username and (a derivative of) this is sent to the server.
2. The server verifies that the user is enrolled and if so, he does the following:
    (a) Generate a 10×n random matrix $\mathcal{R}$ such that all entries in each column are unique.
    (b) Generate n random permutations $\pi_i$ acting on the set $\{0,1,2,\ldots,9\}$.
    (c) Generate n sets of display data $\omega_0^i \ldots \omega_0^i$.
    (d) Define for i=0 ... n-1 the table $\mathcal{T}$ containing on row j the pair $(\omega_{\pi_i(j)}^i, \mathcal{R}_{\pi_i(j),i})$.
    (e) Reply with the just randomly chosen keyboard $\mathcal{K} = \mathcal{T}^0, \ldots, \mathcal{T}^{n-1}$.
3. The user is presented $\mathcal{K}$ and he enters his PIN=$p_0,\ldots,p_{n-1}$ resulting in the string $\mathcal{S} = \mathcal{T}_{j_0}^0, \ldots, \mathcal{T}_{j_{n-1}}^{n-1}$, which is sent back to the server.
4. The server reconstructs PIN using $\mathcal{S}$ and $\mathcal{R}$ using the relation $\mathcal{R}_{p_i,j} = \mathcal{S}_j$, following from the fact that the user chooses his i-th PIN digit $(p_i)$ in row $j_i$ of table T. Thus we conclude that $\pi_i(j_i)$ satisfies $(\omega_{\pi_i(j_i)}^i = \omega_{p_i}^i)$ so that $T_{j_i}^i = R_{\pi_i(j_i),i} = R_{p_i,i}$.
5. Finally, the server verifies the PIN using his database and removes all generated data from his memory.

Since the server generates fresh random keyboards, $\mathcal{S}$ will be accepted only once by the server. Therefore, an attacker cannot replay $\mathcal{S}$ to impersonate the user. Moreover, this randomness ensures that an active memory scraper on the user's device can gather no sensible information over time about the user's entered PIN.

The above procedure can also be used to secure the enrollment of a user against memory scraping just by removing the enrollment check and replacing the verification part on the server side with storing the user credentials securely in the data base.

To disable the memory scraper on the server to obtain sensitive passwords or PINS we propose the following.

Let $G=\langle g \rangle$ be a group generated by g of large prime order p. Suppose that the server has a database containing usernames $\mathcal{U}$ and password derivation $$P(U)=g^{PIN_U}y_U$$

where $PIN_U$ is the user's PIN and $y_U$ some unknown element of G. Since P(U) is a Pedersen Commitment which is information theoretically hiding, P(U) contains no information about PIN when $y_U$ is not known [1].

Let $[[x]]_k$ denote the El-Gamal encryption [2] of x with secret key k. Thus $$[[x]]_k(g^T, h^T x),$$

where T is some uniform random value modulo p and $h=g^k$.

We assume the user U has stored the $y_U$ that is used in P(U).

Authentication now proceeds as follows:
1. A user enters his username and (a derivative of) this is sent to the server.
2. The server verifies that the user is enrolled and if so, he does the following:
    (a) Generate a random secret key $k \in \mathbb{Z}_p$.
    (b) Generate a 10×n random matrix $\mathcal{R}$, where $\mathcal{R}_{ij} = [[g^{10^{n-1-j}*i}]]_k$.
    (c) Generate n random permutations $\pi_i$ acting on the set $\{0,1,2,\ldots,9\}$.
    (d) Generates n sets of display data $\omega_0^i, \ldots, \omega_9^i$.
    (e) Define for i=0, ..., n-1 the table $\mathcal{T}^i$ containing on row j the pair $(\omega_{\pi_i(j)}^i, \mathcal{R}_{\pi_i(j),i})$.
    (f) Reply with the just randomly chosen keyboard $\mathcal{K} = \mathcal{T}^0, \ldots, \mathcal{T}^{n-1}$ and the public key $h=y^k$.
3. The user is presented $\mathcal{K}$ and he enters his PIN$_U$=$p_0,\ldots,p_{n-1}$ resulting in the string $\mathcal{S}' = \mathcal{T}_{p_0}^0, \ldots, \mathcal{T}_{p_{n-1}}^{n-1}$.
4. The user retrieves from memory and generates a random encryption $[[y_U]]_k$ using public key n.
5. the user replies with $\mathcal{S} = [[y_U]]_k * \Pi_{i=0}^{n-1} \mathcal{S}'_i$.
6. The server decrypts $\mathcal{S}$ and verifies whether it matches P(U).
7. Finally, removes all generated data from his memory.

Instead of a 10 by n matrix for the set $\{0,1,2,\ldots,9\}$, a different character set may be used.

correctness: Note that the digital string PIN$_U$=$p_0,\ldots,p_{n-1}$ can be represented by the integer $$\Sigma_{i=0}^{n-1} 10^{n-i-1} p_i.$$

Furthermore, from $$S'_i = T_{j_i}^i = R_{\pi_i(j_i),i} = R_{p_i,i} = [[g^{10^{n-1-j}*p_i}]]_k$$

homomorphism of El-Gamal implies $$\prod_{i=0}^{n-1} S'_i = \prod_{i=0}^{n-1} [[g^{10^{n-i-1}*p_i}]]_k = [[g^{\sum_{i=0}^{n-1} 10^{n-i-1}*p_i}]]_k = [[g^{PIN_U}]]_k$$

so that $$\mathcal{T} = [[y_U]]_k * \Pi_{i=0}^{n-1} S'_i = [[P(U)]]_k.$$

Enrollment: Enrollment now proceeds as follows:
1. A user enters his username and (a derivative of) this is sent to the server.
2. The server verifies that the user is NOT enrolled and if so, he does the following:
    (a) Generate a random secret key $k \in \mathbb{Z}_p$.
    (b) Generate a 10×n random matrix $\mathcal{R}$, where $\mathbb{R}_{ij} = [[g^{10^{n-1-j}*i}]]_k$.

(c) Generate n random permutations acting on the set $\{0,1,2,\ldots,9\}$.
(d) Generate n sets of display data $\omega_0^i, \ldots, \omega_9^i$.
(e) Define for $i=0, \ldots, n-1$ the table $\mathcal{T}^i$ containing on row j the pair $(\omega_{\Pi^i_{\pi^i(j)}}, \mathcal{R}^\pi_i(j), i)$.
(f) Reply with the just randomly chosen keyboard $\mathcal{K} = \mathcal{T}^0, \ldots, \mathcal{T}^{n-1}$ and the public key $h=g^k$.

3. The user is presented $\mathcal{K}$ and he enters his chosen PIN $_U - p_0, \ldots, p_{n-1}$ resulting in the string $\mathcal{T}' = \mathcal{T}_{j_0}^0, \ldots, \mathcal{T}_{j_{n-1}}^{n-1}$.

4. The user generates a random $y_U$ and random encryption $[[y_U]]_k$ using public key h.

5. The user replies with $\mathcal{T} = [[y_U]]_k * \Pi_{i=0}^{n-1} S'_i$.

6. The server decrypts $\mathcal{T}$ into P(U) and stores user U along with P(U).

7. Finally, removes all remaining generated data from his memory.

Server Zero Knowledge: The server only sees a randomized encryption of P(U) and P(U) itself. From the semantic security of El-Gamal [3] it follows that multiplying a randomized encryption of y with the result of the keyboard hides all choices the user made on the keyboard to the server as well. This also known as blinding an encryption. Furthermore, Pedersen commitment ensures that P(U) cannot be used to extract PIN.

Note: both prime fields as elliptic curves can be used to define a proper group implementing the above embodiments.

REFERENCES

[1] Pedersen: *Non-interactive and information-theoretic secure verifiable secret sharing*. In Advances in Cryptology CRYPTO '91 Springer
[2] T. ElGamal: *A public key cryptosystem and a signature scheme based on discrete logarithms*. In Proceedings of CRYPTO 84 on Advances in Cryptology, pages 10-18, New York, N.Y., USA, 1985. Springer-Verlag New York, Inc.
[3] Y. Tsiounis and M. Yung: *On the security of ElGamal based encryption*. In H. Imai and Y. Zheng, editors, Public Key Cryptography, volume 1431 of Lecture Notes in Computer Science, pages 117-134. Springer, 1998.

Figure 6A:
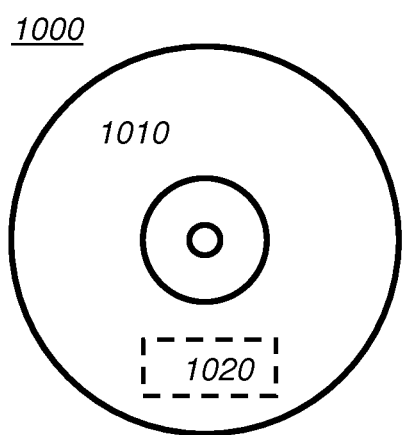

FIG. 6a shows a computer readable medium 1000 having a writable part 1010 comprising a computer program 1020, the computer program 1020 comprising instructions for causing a processor system to perform a client method or a server method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform the client method, or server method according to an embodiment.

Figure 6B:
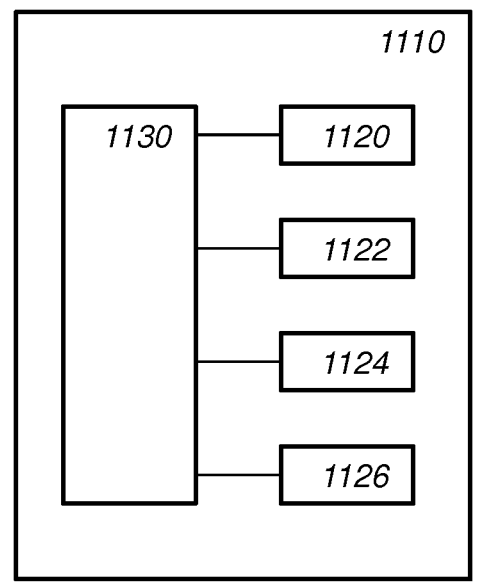

FIG. 6b shows in a schematic representation of a processor system 1140 according to an embodiment. The processor system comprises one or more integrated circuits 1110. The architecture of the one or more integrated circuits 1110 is schematically shown in FIG. 6b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. The programming code configuring the processor system as an embodiment of a client device, or server device.

Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connector, respectively.

For example, in an embodiment, the client device, server device, key generation device, and/or a signature verification device may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A server device for authenticating a user from a client device comprising:
  a storage circuit,
    wherein the storage circuit is arranged to store a first verification number,
    wherein the first verification number is computed from a subset of a set of character/position data,
    wherein the subset is indicated by an authentication string,
    wherein the set of character/position data comprises a number for the combinations of a character from the character set and a position in the authentication string,
    wherein the user has access to the authentication string, wherein the authenticating string has multiple characters at multiple positions,
wherein the characters are selected from a character set; and
a processor circuit,
wherein the processor circuit is arranged to encrypt the set of character/position data,
wherein the set of character/position data is encrypted according to a homomorphic encryption algorithm,
wherein the processor circuit is arranged to send the encrypted set to the client device,
wherein the processor circuit is arranged to receive a second verification number from the client device,
wherein the second verification number is computed by homomorphically computing an encrypted second verification number from a subset of the encrypted set,
wherein the subset is indicated by the authentication string,
wherein the processor circuit is arranged to verify the correspondence between the first verification number and the encrypted second verification number so as to authenticate the user to access a service provided by the server.

2. The server device as in claim 1,
wherein the processor circuit is arranged to generate a permutation of the character set,
wherein the processor circuit is arranged to obtain display data for the characters in the character set,
wherein the display data is associated with an encrypted character/position data corresponding to the character,
wherein the processor circuit is arranged to send the display data to the client device,
wherein the client device is associated with the encrypted character/position data,
wherein the display data is in an order according to the permutation of the character set.

3. The server device as in claim 1, wherein the same display data is used for all positions.

4. The server device as in claim 2,
wherein no display data is sent to the client device for a subsequent authentication,
wherein the client device uses cached display data.

5. The server device as in claim 1,
wherein the first verification number is blinded with a blinding number,
wherein computing the second verification number comprises blinding with the blinding number.

6. The server device as in claim 1, wherein at least a portion of the character/position data are random numbers.

7. The server device as in claim 1,
wherein at least some of the character/position data are computed as multiples of powers of a base number,
wherein at least some of character/position data are computed as powers using exponents,
wherein the exponents are powers of a base number.

8. The server device as in claim 1, wherein verifying the correspondence comprises decrypting the second verification number.

9. The server device as in claim 1, wherein the homomorphic encryption algorithm is a probabilistic homomorphic encryption algorithm.

10. The server device as in claim 1, wherein the verification number is a Pederson commit and/or wherein the encryption is ElGamal encryption.

11. The server device as in claim 1, wherein different display data is generated for at least two different positions.

12. The server device as in claim 1, wherein the correspondence comprises equality.

13. The server device as in claim 1, wherein the correspondence comprises satisfying at least one linear expression.

14. A client device for authenticating a user to a server device comprising:
a processor circuit,
wherein the processor circuit is arranged to receive a set of character/position data,
wherein the set of character/position data is encrypted according to a homomorphic encryption algorithm,
wherein the encrypted set of character/position data comprise a number for the combinations of a character from the character set and a position in an authentication string,
wherein the processor circuit is arranged to homomorphically compute an encrypted second verification number from a subset of the encrypted set of character/position data,
wherein the subset is indicated by the authentication string,
wherein the user has access to the authentication string,
wherein the authenticating string has multiple characters at multiple positions,
wherein the characters are selected from a character set,
wherein the processor circuit is arranged to send the encrypted second verification number to the server device and the user is authorized to access a service via the client device provided by the server device when the second verification number corresponds to a first verification number stored at the server device.

15. The client device as in claim 14,
wherein the processor circuit is arranged to receive display data from the server device,
wherein the server is associated with the encrypted character/position data,
wherein the processor circuit is arranged to display the received display data for each position of the authentication string,
wherein the processor circuit is arranged to receive user input,
wherein the user data is used to select a selected display data from the displayed display data,
wherein the processor circuit is arranged to select the subset in correspondence with the selected display data.

16. The client device as in claim 14, further comprising a storage circuit,
wherein the storage circuit is arranged to store a blinding number,
wherein the processor circuit is configured to blind the encrypted second verification number with the blinding number.

17. The client device as in claim 14, wherein the correspondence between the second verification number and the first verification number comprises equality.

18. The client device as in claim 14, wherein the correspondence between the second verification number and the first verification number comprises satisfying at least one linear expression.

19. A method for authenticating a user from a client device comprising:
storing a first verification number,
wherein the first verification number is computed from a subset of a set of character/position data,
wherein the subset is indicated by the authentication string, wherein the set of character/position data comprises a number for the combinations of a character from the character set and a position in an authentication string, wherein the user has access to the authentication string, wherein the authenticating string has multiple characters at multiple positions, wherein the characters are selected from a character set;

encrypting the set of character/position data, wherein the set of character/position data is encrypted according to a homomorphic encryption algorithm;

sending the encrypted set to the client device;

receiving a second verification number from the client device, wherein the second verification number is computed by homomorphically computing an encrypted second verification number from a subset of the encrypted set, wherein the said is indicated by the authentication string; and verifying the correspondence between the first verification number and the encrypted second verification number so as to authenticate the user to access a service provided by the server.

20. A computer program stored on a non-transitory medium, wherein the computer program when executed on a processor performs the method as claimed in claim 19.

21. The method as in claim 19, further comprising:

generating a permutation of the character set;

obtaining display data for the characters in the character set, wherein the display data is associated with an encrypted character/position data corresponding to the character; and sending the display data to the client device, wherein the client device is associated with the encrypted character/position data, wherein the display data is in an order according to the permutation of the character set.

22. The method as in claim 19, wherein the correspondence comprises equality.

23. The method as in claim 19, wherein the correspondence comprises satisfying at least one linear expression.

24. A method for authenticating a user to a server device comprising:

receiving a set of character/position data, wherein the set of character/position data is encrypted according to a homomorphic encryption algorithm, wherein the encrypted set of character/position data comprises a number for the combinations of a character from the character set and a position in an authentication string, wherein the user has access to the authentication string, wherein the authenticating string has multiple characters at multiple positions, wherein the characters are selected from a character set;

homomorphically computing an encrypted second verification number from a subset of the encrypted set of character/position data, wherein the subset is indicated by the authentication string, sending the encrypted second verification number to the server device and the user is authorized to access a service via the client device provided by the server device when the second verification number corresponds to a first verification number stored at the server device.

25. The computer program stored on a non-transitory medium, wherein the computer program when executed on a processor performs the method as claimed in claim 24.

26. The method as in claim 24, further comprising:

receiving display data from the server device, wherein the server is associated with the encrypted character/position data;

displaying the received display data for each position of the authentication string;

receive user input, wherein the user data is used to select a selected display data from the displayed display data; and selecting the subset in correspondence with the selected display data.

27. The method as in claim 24, wherein the correspondence between the second verification number and the first verification number comprises equality.

28. The method as in claim 24, wherein the correspondence between the second verification number and the first verification number comprises satisfying at least one linear expression.

* * * * *